Patented Mar. 20, 1934

1,951,538

UNITED STATES PATENT OFFICE 1,951,538

ACTIVATED CARBON

Georges Joseph Laurent Tielens, Brussels, Belgium, assignor to "Maximine" Société Anonyme, Verviers, Belgium, a company No Drawing. Application February 21, 1930, Serial No. 430,458. In Belgium February 25, 1929

5 Claims. (Cl. 252—3)

This invention has for its object a process for the preparation of a purifying and decolorizing agent for solutions of various bodies loaded with colloidal impurities and more especially of the raw intermediate products of the sugar industry.

As is well known, the solutions of this kind, as well as those of other substances, such as glucose, glycerin, etc. . . ., are generally purified by filtration through bone charcoal.

This purification is always preceded by a preliminary mechanical filtration intended to eliminate from the juices the matters in suspension which have various degrees of fineness and which affect the efficiency of the bone charcoal in an unfavorable manner. This preliminary filtration, however, only withdraws a very small portion of the colloidal combinations, colored or not, which are present in the solutions to be treated and it is necessary in practice to operate the purification by active charcoals, for example, by bone charcoal which, employed in large quantities, allows almost whole elimination of the colorless and colored colloids from the treated juices. This process, however, has important drawbacks resulting, on the one hand, from the large quantity of bone charcoal which must be used and, on the other hand, from the difficulties inherent to its recovery. Consequently, for several years, one has sought to substitute for bone charcoal other charcoals having a greater activity. These active charcoals, in the powdered state, absorb generally fairly easily colored materials, owing to their relatively coarse texture, but they are much less efficient with respect to colorless colloids which are in a state of extreme division in the treated solutions.

Now, the extraction of the last traces of these colloids is of great importance inasmuch as it is these, for example, which give an unpleasant grey appearance to the white crystallized sugar. On the other hand, the viscosity of sugar solutions, for example, is considerably increased by the presence of colorless colloids, so that the speed of filtration of sugar solutions depends in the first place on the more or less complete elimination of these colloids. The latter can even, in certain cases, for example in cane sugar solutions, load these solutions to the extent of rendering their purification practically impossible owing to the quantity of charcoal which it would be necessary to employ. It results from these considerations that the purification, that is to say, the driving out of the colorless colloids is at least as important, and in certain cases even more important, than the decoloration properly so called. While the bone charcoal, used in great excess adsorbs fairly well the colored and colorless colloids, this result cannot be obtained in practice by means of powdered active decolorizing charcoals, because of the high cost of the quantities which it would be necessary to use to this effect, which would be absolutely prohibitive.

The present invention has for its purpose to obtain a decolorizing and purifying agent which is adapted to precipitate all the colloids from the most impure solutions.

According to the invention, the organic substances which serve as crude materials for the preparation of the charcoal are first finely pulverized, in order to obtain their dissolution as completely as possible and they are subsequently hydrolyzed, preferably under pressure, until a complete or almost complete dissolution is obtained, after which the reacting mass is treated by heating in a closed vat under a pressure of 3-5 atmospheres and at a relatively low temperature (200 to 300° C.) for producing the evaporation of the water, until its consistency becomes thick and the destruction of the carbonated substances is accomplished.

In practice the hydrolysis may be produced either by means of the action of sulphuric acid, or by means of the action of hydrochloric acid.

It must be observed that in this process the mass is maintained in the moist state during all the phases of the manufacture and the product which is obtained is practically in the state of a "sol". A product possessing the above mentioned properties can only be obtained by a process by means of which it is possible to dissolve completely or as completely as possible, the crude materials and to maintain it during the whole course of its manufacture, in a moist state.

In order to well explain the invention, it will be described hereafter in greater detail by considering separately an example of the manner in which the two processes which can be adopted may be carried out.

(a) *Treatment by means of hydrochloric acid*

In a suitable vat capable of being put under pressure is placed a concentrated solution of zinc chloride of about 60° Bé. and finely pulverized cellulose is mixed with it in proportions of from 1:4 to 1:10, calculated with respect to the quantity of dry zinc chloride. A little hydrochloric acid is then added to this mixture, and it is heated until the water in excess is evaporated and until the cellulose is completely dissolved.

Wood or sawdust, which are not completely soluble in zinc chloride, are treated in the same manner. It is useful to perform the hydrolysis of these latter materials under pressure. After dissolution, or after the mass is in a state of almost complete dissolution, the water is driven out by evaporation from the reacting mass and the organic matters in the said mass are consequently destroyed. The quantity of zinc chloride must be calculated so that the reacting mass is still liquid or at least soft after the water has been evaporated at a temperature above 260° C. Subsequently the vat is covered up and heated up to a temperature about 200° C.

After cooling the reacting mass is washed until the washing waters contain no more free zinc chloride or hydrochloric acid. The last traces of acid which could still occur in the charcoal are then neutralized with an alkaline substance which does not cause the charcoal to flocculate, for example sodium carbonate, soda lye, ammonia, etc. . . ., with the exception, however, of chalk or other similar products. The mass so obtained is then allowed to stand for several hours and the charcoal is finally washed until complete purity is obtained.

The mass of charcoal is then finely ground in the moist state and packed under the form of a paste with a water content of 80–90%.

(b) *Treatment by means of sulphuric acid*

As it has already been stated, other hydrolyzing agents than hydrochloric acid, for example, concentrated sulphuric acid can also be used for obtaining soluble colloidal active charcoal, that is to say, in the state of a colloidal solution. In this case, a product is obtained the purifying action of which is very good, but the decolorizing action of which is not quite so good as the charcoal obtained by means of the process which has just been described. The charcoal obtained by means of the treatment with sulphuric acid can, however, render great services particularly when large quantities of solutions must be treated and when these only contain small proportions of colorless or colored colloids.

In the treatment by sulphuric acid, the crude materials must be rendered completely or almost completely soluble. Now, the cellulose treated by sulphuric acid is transformed, already at ordinary temperature, in a state very near that of dissolution; the destruction of the organic matters is obtained by continuing the heating. During the formation of the charcoal, it is necessary to make sure that the latter will not become dry, which is a somewhat delicate procedure because the water vapors, the sulphurous acid vapors and sulphuric acid vapors, by escaping, could allow it to become dry, while it is indispensable to maintain the charcoal in the moist state. This result is obtained by the addition of a sulphate or bisulphate, for example, potassium bi-sulphate, which is dissolved in the sulphuric acid which is employed.

It is in this manner possible to maintain the reacting mass in the liquid state until the end of the process.

In practice the process is carried out as follows:

The cellulose or other organic matter, finely divided, such as wood, wood-pulp, etc. . . ., is mixed at ordinary temperature with concentrated sulphuric acid in excess.

This mass is then allowed to stand for half an hour, approximately, and the excess of sulphuric acid is then removed and the mass is mixed with potassium bi-sulphate in proportions of from 1 to 3 to 1 to 5, calculated with respect to the material when normally dry. This operation must take place in a pressure vat internally lined with lead. After having mixed the potassium bi-sulphate, gentle heating of the mass is begun. The heating of the open vat must be continued until the greatest portion of the water contained in the reacting mass has evaporated, this causing at the same time the destruction of the organic matters. The vat is then closed and heated under a pressure of from 3 to 5 atmospheres in order to reach a final temperature of about 200° C. The subsequent operations, particularly the washing, the neutralization and the packing of the charcoal so produced, are carried out exactly as in the example described in the first place.

In both cases, that is to say, whether the treatment is carried out by means of zinc chloride and hydrochloric acid or by means of sulphuric acid, a soluble colloidal charcoal is obtained, that is, a charcoal in the state of colloidal solution, possessing high purification qualities and good decolorizing qualities, which is in the state of a "sol".

The recovery of the active charcoals, obtained according to the two processes mentioned, or of the charcoals having other origins, may be carried out in a manner similar to that of the process of product.

It will be noticed that, in the process described in the first place, use is made of zinc chloride. The zinc chloride, and also a mixture of zinc chloride and calcium chloride have already been advocated for the manufacture of active carbons; in all these manufactures, however, such as they were carried out formerly, no importance whatever had been hitherto attached to the obtainment of a product in the state of colloidal solution and the operation was, on the contrary, conducted so as to obtain a charcoal in as coarse a state of division as possible. The active carbons obtained in this manner according to the processes previously known, have always been put on the market under the form of a powder having from 10 to 20% of water. Their use has been rarely advocated under the form of a paste and, in this case, it was simply a question of adding water to the powdered charcoal in order to allow it to be used in certain special industries. Even in the form of paste, however, these active charcoals had not very great colloidal properties, neither had the normally dry powder. As a matter of fact, they differed essentially from the active charcoal employed in accordance with the present invention, charcoal which, as has already been mentioned, is comparable to a "hydrosol" and not to a "gel" as was the case for the charcoal obtained previously.

What I claim is:

1. A process for the preparation of an active charcoal for the purification and the decoloration of solutions of various bodies loaded with colloidal impurities, the said process consisting in introducing into a vat a concentrated solution of zinc chloride in mixing pulverized cellulose with the said solution in the proportion of 1 to 4 to 1 to 10 calculated with respect to the quantity of dry zinc chloride, in adding to this mixture hydrochloric acid and in heating the mixture until the water in excess is evaporated and until the cellulose is completely dissolved.

2. A process for the preparation of an active charcoal for purifying and decoloring solutions of various substances containing colloidal impurities which process comprises finely pulverizing a carbonaceous substance, dissolving and hydrolyzing the substance with an acid in the presence of zinc chloride, heating the resultant mass first at normal temperature, and then to a temperature between 200 and 300 degrees and under a pressure of 3 to 5 atmospheres, the quantity of zinc chloride being such that the mass remains fluid at temperatures above 260° and a paste containing 50 to 90% water is formed.

3. A process for the preparation of an active charcoal for purifying and decoloring solutions of various substances containing colloidal impurities which process comprises finely pulverizing a carbonaceous substance, dissolving and hydrolyzing the substance with sulphuric acid, heating the mass so obtained first at normal temperature and then to a temperature between 200 and 300 degrees and under a pressure of 3 to 5 atmospheres, adding to the mass a sulphate.

4. A process for the preparation of an active charcoal for purifying and decoloring solutions of various substances containing colloidal impurities which process comprises finely pulverizing a carbonaceous substance, dissolving and hydrolyzing the substance with an acid in the presence of a salt, heating the resultant mass first at normal temperature, and then at a temperature between 200° and 300° C. and under a pressure of 3 to 5 atmospheres, the quantity of the salt intermixed with the carbonaceous substance and acid being such that the mass remains fluid during the processing thereof and a paste containing 50–90% water is formed.

5. A process for the preparation of an active charcoal for purifying and decolorizing solutions of various substances containing colloidal impurities which process comprises finely pulverizing a carbonaceous substance, adding zinc chloride to the substance and treating the mixture with hydrochloric acid and heating the resultant mixture, the quantity of zinc chloride being such that the mass remains moist during the heating thereof and a paste containing 50–90% water is formed.

GEORGES JOSEPH LAURENT TIELENS.